United States Patent Office 2,885,930
Patented May 12, 1959

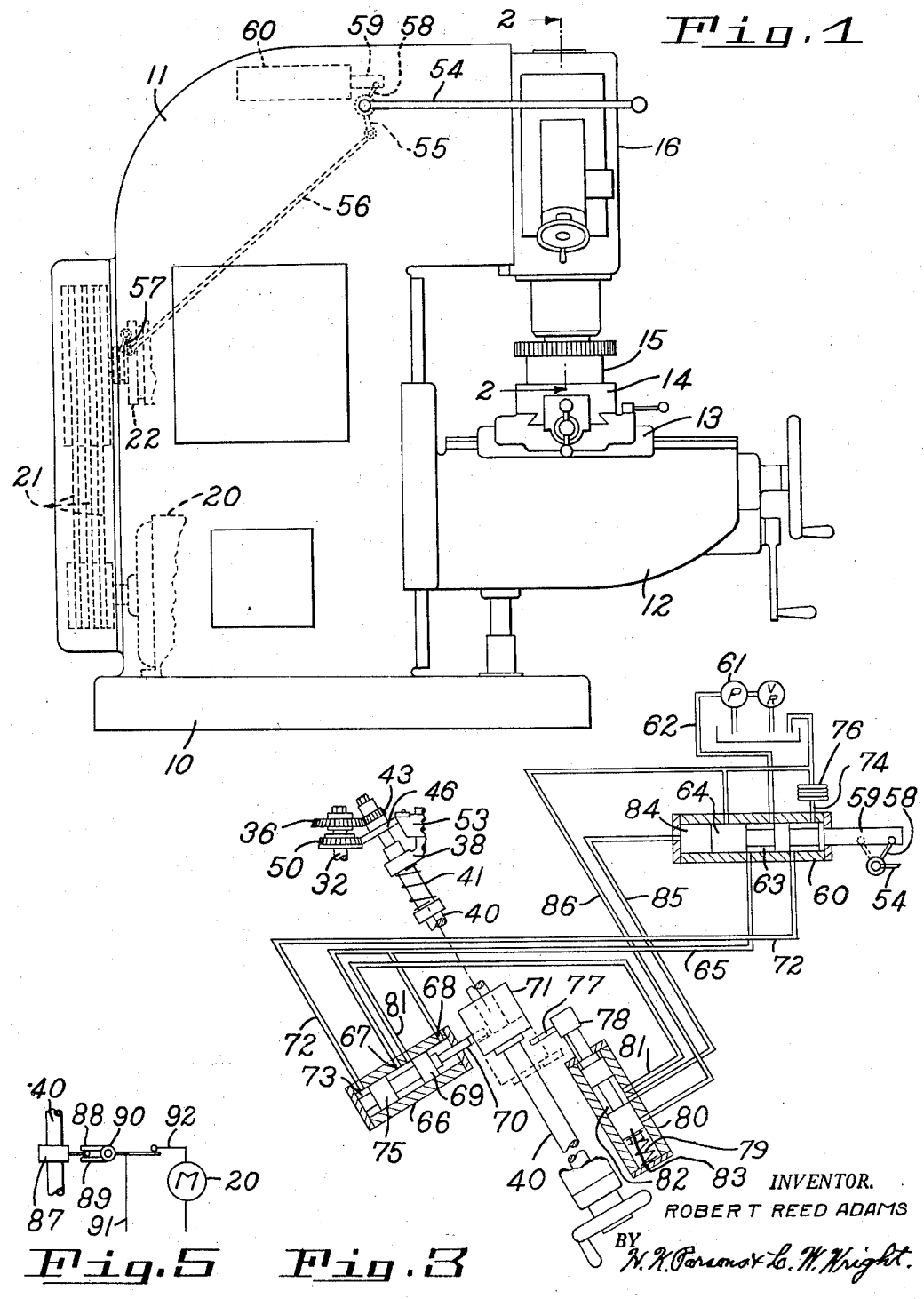

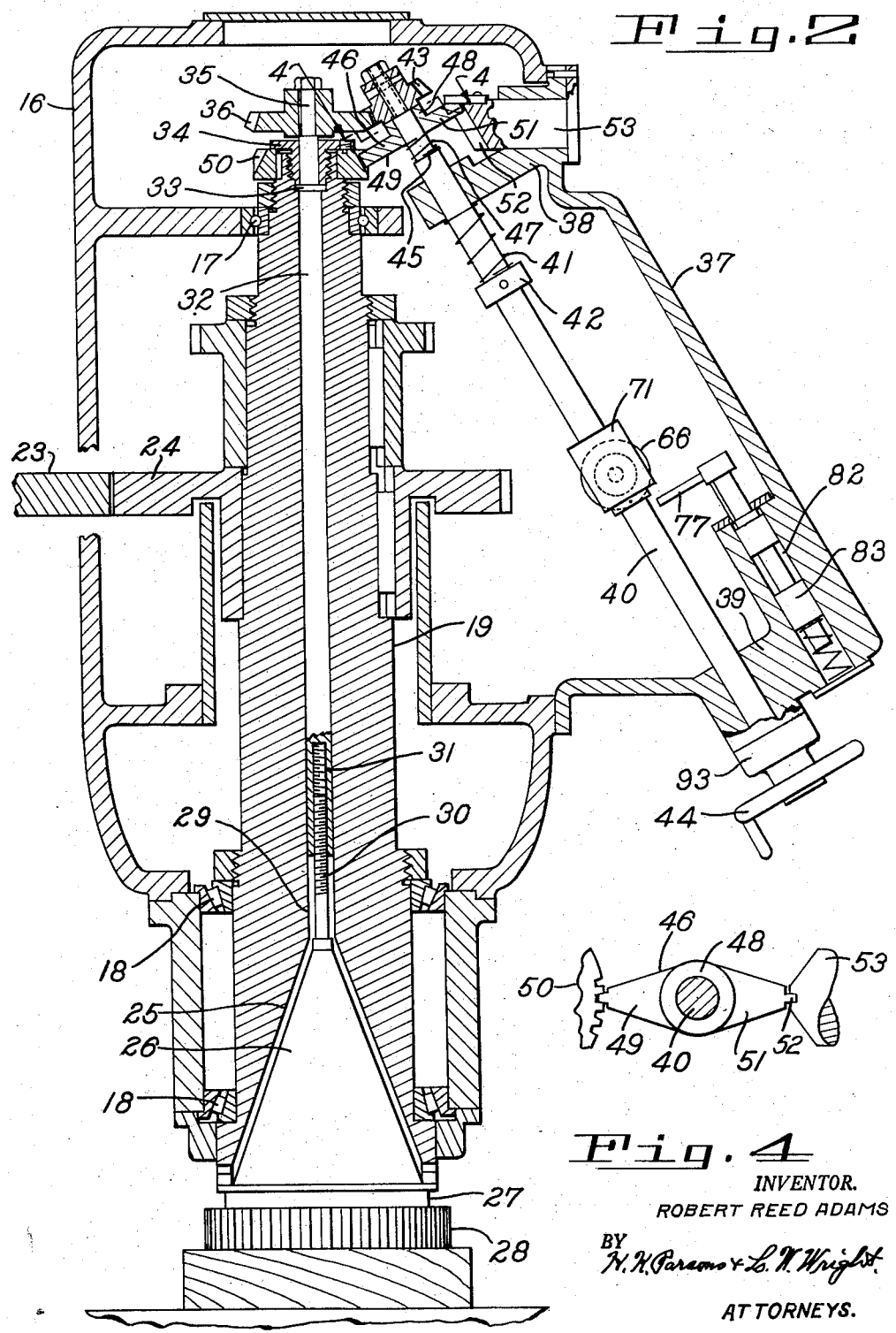

2,885,930

POWER DRAWBAR FOR A MILLING MACHINE

Robert Reed Adams, Cincinnati, Ohio, assignor to The Cincinnati Milling Machine Co., Cincinnati, Ohio, a corporation of Ohio Application October 11, 1954, Serial No. 461,603

7 Claims. (Cl. 90—11)

This invention relates to improvements in milling machines and has particular reference to an improved construction for facilitating the mounting of cutter arbors on milling machine spindles.

In milling machines it is customary to permanently mount a spindle, frequently of appreciable length, within the body of the machine, the power for performing the cutting operation being transmitted to this spindle. In many instances, use is made of a special arbor for supporting the cutter at one end of the spindle and to employ a locking means extending through the spindle for securing the arbor in position. Due to the remote location of the cutter from the opposite terminal end of the spindle, difficulty has been experienced in properly tightening the cutter bearing arbor in position, especially in the case of large milling machines of the vertical type where the exposed end of the draw bolt employed for the tightening purpose can be reached only by use of a ladder or by climbing up on the machine itself. Furthermore, difficulty has been experienced in effecting a proper tightening due to tendency of the spindle itself to move or turn as the draw bolt is tightened.

It is one of the objects of the present invention to provide an improved form of construction which will greatly simplify the proper mounting and tightening of cutter arbors on milling machine or similar machine tool spindles.

A further object of the invention is the provision of a construction particularly adapted for use in connection with milling machines of the vertical type which will enable the operator adequately to secure or release the cutter and cutter arbor from his normal operating position at the machine.

Another object of the invention is the provision of a simple but effective type of structure in which turning or slipping of the milling machine spindle will be prevented during the tightening or loosening operation.

Additionally, the invention has for its purpose the provision of an improved structure which will prevent application of power to the milling machine spindle during the cutter securing or loosening operation and which will likewise prevent damage to the machine or parts due to attempted shifting of the cutter attachment control mechanism when the spindle is being power driven.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 1 is a side elevation of one form of milling machine embodying the present invention.

Figure 2 is a vertical section on the line 2—2 of Figure 1.

Figure 3 is a diagrammatic view particularly illustrating the safety interlocks between the cutter securing mechanism and the spindle drive control.

Figure 4 is a fragmentary section on the line 4—4 of Figure 2.

Figure 5 is a diagrammatic view illustrating an electrical control safety device.

In the drawings the numeral 10 designates the bed of a vertical milling machine having a column 11, on which is vertically adjustable the knee 12 bearing saddle 13 and table 14 for support of the workpiece 15. Slidably mounted on the column 11 is the spindle carrier or support member 16 in which is rotatably supported on bearings 17 and 18 the tubular spindle 19.

Contained within the column 11 is the drive motor 20 connected through the drive belts 21 and clutch 22 with suitable conventional gearing for effecting rotation of the spindle. This gearing terminates in the drive gear 23 meshing with the driven gear 24 which is secured on the spindle 19, the foregoing parts being of well-known conventional commercial construction. The spindle 19 is provided with the tapered or conical socket 25 to receive the taper cone portion 26 of arbor 27 to which is secured the milling cutter 28. Extending into the hollow center or bore 29 of the spindle 19 is the threaded stud or bolt 30 carried by the arbor 27. The threaded portion of the stud 30 engages the internally threaded socket 31 of draw bolt 32 which extends axially or lengthwise of the spindle and is provided with a flange 33 rotatably supported while held against axial movement relative to the spindle by the flange engaging nut 34.

The draw bolt 32 has a projecting terminal portion 35 on which is keyed the bevel gear 36. The spindle housing 16 is provided with an offset support portion 37 having the guide ribs 38 and 39 mounting the drive and shifter rod 40 for rotation and axial shifting movement. A spring 41 bearing against collar 42 on the rod 40 urges the rod into an outward position. The rod 40 bears on its inner end a bevel gear 43 which, when the rod is moved into its inner position, as shown in Figure 2, meshes with the gear 36 so that rotation of the rod 40 and gear 43 will be effective to turn gear 36 and thus the draw rod 32 in one direction or the other depending on the direction of rotation of the shifter 40. On its outer end rod 40 supports the operating wheel or handle 44 which controls both the axial sliding or shifting movement of the rod 40 and also its rotation.

Near its inner end the rod 40 is provided with a shoulder 45, while slidably mounted on the rod between the shoulder 45 and gear 43 is the spindle lock member 46 inwardly urged by the spring 47. This lock member has a central hub 48 rotatably mounted on the rod 40 and a pair of lateral extensions. The left hand extension 49, as viewed in Figures 2 and 4, is notched to interlock with the teeth on the gear 50 splined to the rear end of the spindle 19. The right hand extension 51 slidably interlocks with the spline 52 formed on the block 53 secured in the housing 16.

By this construction, when the rod 40 is moved inwardly to cause gear 43 to mesh with gear 36 by the positive urge effected by rod 40, the locking member 46 is simultaneously impositively correspondingly moved by the reaction of spring 47. As the right hand extension of the locking member is interlocked with the housing or support for the parts, this movement will cause the left hand extension 49 to move into engagement with the teeth 50 of the spindle gear, thus positively locking the the spindle gear and the spindle against rotation. The parts having been moved to this position the turning of handle 44 will rotate the draw bolt 32 to control either the clamping or the unclamping of the cutter arbor 26. On release of handle 44 expansion of spring 41 will move the rod and handle outward, positively moving the locking member 46 out of engagement with the gear 50 and the gear 43 out of engagement with the gear 36 so that these parts are free to rotate.

To prevent possible damage of the parts it is preferable that interlock means be provided to prevent engagement of the gears 36—43 while the spindle is being power driven and alternately to prevent application of power to the spindle until the locking and adjusting members have been released or withdrawn. One mechanism for accomplishment of this result has been particularly illustrated in connection with Figures 1 and 3. By reference to these it will be noted that the machine is provided with a clutch shifter arm 54 pivoted to the column 11 and provided with a rock arm 55 coupled by link 56 with the clutch shifter 57. Downward movement of lever 54, as in the position shown in Figure 1, will move the clutch 22 into a non-driving position. This movement of the clutch shifter rod 54 serves additionally to oscillate the arm 58 coupled with valve stem 59 movable in the valve bushing 60.

Pump 61 supplies hydraulic actuating medium under pressure to conduit 62 and, in the clutch disconnected position of shifter 54 and arm 58, this pressure is transmitted past groove or cannelure 63 of valve 64 to conduit 65 ported into valve bushing 66 at points 67 and 68. The pressure entering through port 68 reacts against piston 69 moving the same toward the left the full line position indicated in Figure 3, retracting the interlock stop plunger 70 normally disposed in the path of the collar 71 carried by the rod 40. At the same time the movement of the valve 64 connects the conduit 72 extending to the cylinder or chamber 73 at the left hand end of bushing 66 with the low pressure return conduit 74, expelled fluid from the chamber on account of the movement of the pistons 69—75 being retarded by the resistance 76.

It will be evident that when the clutch shifter rod 54 is moved upwardly to connect the motor drive to the spindle transmission that the valve 64 will be simultaneously moved toward the left as viewed in Figure 3 when pressure conduit 62 will be coupled with 72 urging piston 75 to the right to project the stop 70 inward and hold it in that position, preventing inward movement of the member 40.

With the parts in the position shown in Figure 3, inward movement of the member 71 will release the restraint on the interlock pin 77 carried by valve stem 78, which is urged inwardly or in a direction following up the inward movement of collar 71 by spring 79 contained in bushing 80. In Figure 3, member 78 is shown in its innermost position at which point the pressure conduit 65 is connected by way of porting 67 with conduit 81 which, in turn, is connected by the cannelure or groove 82 on valve 83 with the pressure cylinder 84 at the left hand end of bushing 60. This pressure reacts against valve 64 holding the valve and thus the shifter lever 54 in clutch disengaging position. When the shifter rod 40 is moved outwardly or downwardly as viewed in Figure 3, collar 71 will depress pin 77 and valve 83 so that when the parts are properly retracted conduit 85 will be connected to the reservoir conduit 86, relieving the interlock hydraulic pressure against valve 64 so that the member 54 may be rocked to shift the clutch into driving position.

From the foregoing it will be noted that the present construction provides in a milling machine a support for the cutter spindle in connection with an elongated draw bolt extending through the spindle, means shiftable positively to lock the spindle against rotation and available at the same time to effect a clamping or unclamping rotation of the draw bolt to control the securing in position of the cutter arbor. It will further be evident that the machine as an entirety includes a power drive selectively available for rotating the spindle or disconnectible from the spindle, and that the shifting means for the spindle clamp and draw bolt rotating devices and for the connection or disconnection of the power drive with the spindle include interlock devices to prevent simultaneous employment of the power drive and the spindle lock, which devices are under control of the draw bolt drive shifter mechanism.

While a detailed structure for effecting hydraulic interlock of the parts has been particularly illustrated in Figure 3 it will be understood that a suitable electrical, mechanical, or other interlock mechanism may be employed, the hydraulic circuit in itself including definite mechanical interlocks.

A simplified form of electrical interlock has been diagrammatically indicated in Figure 5 in which the rod 40 is provided with a trip dog 87 selectively engageable during in and out movements of the member 40 with either plunger 88 or plunger 89 of the electrical snap switch 90. One of the current leads 91 for the motor 20 extends to the switch 90. When the member 40 is retracted the trip 87 will depress plunger 89, actuating the switch to complete the electrical power circuit to motor 20 through line 92. Alternatively, as the member 40 is moved inwardly to shift the gear 43 into effective position, the trip will depress the plunger 88, opening switch 90 and thus disconnecting electric power for driving the spindle operating motor 20.

To facilitate tightening or loosening of the draw bolt, the operating handle 44 may be connected to the rotary shifter 40 by a ratchet or lost motion device indicated at 93 in Figure 2. This permits limited movement of the handle or wheel 44 with regard to the member 40 so that limited relative rotation effecting a slight hammering action may be employed for adequately tightening and setting the draw bolt 32.

What is claimed is:

1. A device for tightening a threaded draw bolt and cutter arbor in position in a tubular cutter spindle, the draw bolt and the spindle each having a gear element, said device including a rod supported for sliding movement, a gear secured on the rod and movable by sliding of the rod into mesh with the gear element on the draw bolt, a lock member rotatably mounted on the rod for movement therewith in a direction to engage or disengage the gear element on the spindle, and a fixed guide engaging the lock member to prevent its rotation when in engagement with the gear element on the spindle, and manually operable means for rotating the rod and thereby the draw bolt.

2. A device for tightening a threaded draw bolt and cutter arbor in position in a tubular cutter spindle, the draw bolt and the spindle each having a gear element, said device including a rod supported for sliding movement, a gear secured on the rod and movable by sliding of the rod into mesh with the gear element on the draw bolt, a lock member rotatably mounted on the rod for bodily movement therewith in a direction to engage or disengage the gear element on the spindle, and a fixed guide engaging the lock member to prevent its rotation when in engagement with the gear element on the spindle, said lock device having a hub slidable on the rod, a spring reacting against the lock device for urging it to slide in one direction relative to the rod, and manually operable means for rotating the rod and thereby the draw bolt.

3. A device for tightening a threaded draw bolt and cutter arbor in position in a tubular cutter spindle, the draw bolt and the spindle each having a gear element, said device including a rod supported for sliding movement, a gear secured on the rod movable by sliding of the rod into mesh with the gear element on the draw bolt, a lock member mounted on the rod for bodily movement therewith in a direction to engage or disengage the gear element on the spindle, a guide engaging the lock member to prevent its rotation when in engagement with the gear element on the spindle, a collar carried by the rod, and a retractible stop projecting into the path of movement of the collar to limit said movement of the rod, and manually operable means for rotating and sliding the rod.

4. A device for tightening a threaded draw bolt and cutter arbor in position in a tubular cutter spindle, the draw bolt and the spindle each having a gear element, said device including a rod supported for sliding movement, a gear secured on the rod and movable by sliding of the rod into mesh with the gear element on the draw bolt, a lock member mounted on the rod for bodily movement therewith in a direction to engage or disengage the gear element on the spindle, a guide engaging the lock member to prevent its rotation when in engagement with the gear element on the spindle, a collar carried by the rod, a retractible stop projecting into the path of movement of the collar to limit said movement of the rod, and a machine tool control valve adjacent the rod, said valve having an interlock pin engageable by the collar to control the position of the valve.

5. In a milling machine, a cutter spindle support, a tubular spindle journaled for power rotation on the support, a draw bolt rotatably supported in the tubular spindle and having a portion terminally projecting therefrom, means restraining the draw bolt against axial movement relative to the spindle, said bolt having a threaded portion for engagement with a cutter arbor, said draw bolt having a threaded portion for engagement with a cutter arbor, a gear on the projecting portion of the draw bolt, a gear on the spindle, a control shaft mounted in said support for rotation and axial movement, manually operable means for effecting said rotation and axial movement, a drive gear carried by said shaft and movable in response to axial movement of said shaft into mesh with said gear on the draw bolt, an interlock automatically movable into blocking position simultaneously with power rotation of the spindle to prevent advance axial movement of said shaft during rotation of the spindle, and additional means supported for free rotation on said shaft for locking the spindle gear to the support simultaneously with meshing of said drive gear.

6. In a milling machine, a cutter spindle support, a tubular spindle journaled for power rotation on the support, a draw bolt rotatably supported in the tubular spindle and having a portion terminally projecting therefrom, means restraining the draw bolt against axial movement relative to the spindle, said draw bolt having a threaded portion for engagement with a cutter arbor, a gear on the projecting portion of the draw bolt, a gear on the spindle, a control shaft mounted in said support for rotation and axial movement, manually operable means for effecting said rotation and axial movement, a drive gear carried by said shaft and movable in response to axial movement of said shaft into mesh with said gear on the draw bolt, an interlock automatically movable into blocking position simultaneously with power rotation of the spindle to prevent advance axial movement of said shaft during rotation of the spindle, additional means supported for free rotation on the shaft for locking the spindle gear to the support simultaneously with meshing of said drive gear, and means responsive to retraction of the interlock and advance of said shaft to block power actuation of the spindle.

7. In a milling machine, a cutter spindle support, a tubular spindle journaled for rotation on the support, a draw bolt rotatably supported in the tubular spindle and having a portion terminally projecting therefrom, means restraining the draw bolt against axial movement relative to the spindle, said draw bolt having a threaded portion for engagement with a cutter arbor, a gear on the projecting portion of the draw bolt, a gear on the spindle, a drive gear, a rod supporting said drive gear, said rod being mounted on the spindle support and movable to engage said drive gear with the gear on the draw bolt, a locking device carried by said rod and movable to engage the gear on the spindle, said locking device having a central portion slidably mounted on the rod and a pair of lateral extensions, one of said extensions projecting for engagement with the spindle gear, and the other extension having a sliding interlock connection with the support, and means for sliding and rotating said rod.

References Cited in the file of this patent

UNITED STATES PATENTS

| | | |
|---|---|---|
| 2,233,790 | Linsley | Mar. 4, 1941 |
| 2,374,919 | Bruseth | May 1, 1945 |
| 2,441,046 | Turrettini | May 4, 1948 |
| 2,501,421 | Stephan | Mar. 21, 1950 |
| 2,557,582 | Turrettini | June 19, 1951 |
| 2,667,820 | De Vlieg | Feb. 2, 1954 |
| 2,685,823 | Kaiser | Aug. 10, 1954 |

FOREIGN PATENTS

| | | |
|---|---|---|
| 669,127 | Germany | Dec. 17, 1938 |